United States Patent
Lee et al.

(10) Patent No.: US 9,129,763 B2
(45) Date of Patent: Sep. 8, 2015

(54) MOBILE TERMINAL

(75) Inventors: Woojin Lee, Seoul (KR); Jiho Lee, Bucheon (KR); Chanyong Mo, Anyang (KR)

(73) Assignee: LG Electronics Inc., Seoul (KR)

( * ) Notice: Subject to any disclaimer, the term of this patent is extended or adjusted under 35 U.S.C. 154(b) by 247 days.

(21) Appl. No.: 13/558,795

(22) Filed: Jul. 26, 2012

(65) Prior Publication Data

US 2013/0114194 A1   May 9, 2013

(30) Foreign Application Priority Data

Nov. 3, 2011   (KR) .................... 10-2011-0114144

(51) Int. Cl.
*H01H 13/705* (2006.01)
*H01H 13/83* (2006.01)
*G06F 1/16* (2006.01)

(52) U.S. Cl.
CPC ........... *H01H 13/705* (2013.01); *G06F 1/1626* (2013.01); *G06F 1/1671* (2013.01); *H01H 13/83* (2013.01); *H01H 2219/006* (2013.01); *H01H 2221/056* (2013.01); *H01H 2221/08* (2013.01); *Y10T 29/4998* (2015.01)

(58) Field of Classification Search
CPC ... H01H 13/83; H01H 13/702; H01H 13/705; H01H 13/7057
USPC .............. 361/679.08; 200/341, 345; 29/527.1
See application file for complete search history.

(56) References Cited

U.S. PATENT DOCUMENTS

| | | | | |
|---|---|---|---|---|
| 4,532,575 A * | 7/1985 | Suwa | ........................ | 361/679.09 |
| 4,937,408 A * | 6/1990 | Hattori et al. | ................. | 200/314 |
| 5,234,744 A * | 8/1993 | Kenmochi | ................. | 428/195.1 |
| 5,655,826 A * | 8/1997 | Kouno et al. | .................... | 362/24 |
| 5,911,317 A * | 6/1999 | Tsai | ................. | 200/514 |
| 6,196,738 B1 * | 3/2001 | Shimizu et al. | ............... | 400/490 |
| 6,734,382 B2 * | 5/2004 | Arai et al. | ..................... | 200/512 |
| 7,462,794 B2 * | 12/2008 | Lee et al. | ..................... | 200/314 |
| 7,946,775 B2 * | 5/2011 | Dombrowski et al. | ........ | 400/490 |
| 8,253,046 B2 * | 8/2012 | Chen et al. | .................... | 200/5 A |
| 8,411,038 B2 * | 4/2013 | Adams et al. | ................. | 345/168 |
| 2001/0032779 A1 * | 10/2001 | Davidson et al. | ............. | 200/341 |
| 2005/0126900 A1 * | 6/2005 | Wang | ............................ | 200/341 |
| 2005/0274594 A1 * | 12/2005 | Yang et al. | .................... | 200/341 |
| 2006/0054484 A1 * | 3/2006 | Uleski et al. | ................. | 200/341 |
| 2013/0114195 A1 * | 5/2013 | Lee et al. | ................. | 361/679.01 |

* cited by examiner

*Primary Examiner* — Adrian S Wilson
(74) *Attorney, Agent, or Firm* — KED & Associates LLP

(57) ABSTRACT

A mobile terminal includes a terminal main body and a keypad assembly provided in the main body and formed to receive a control command, wherein the keypad assembly includes a key top disposed on one surface of the main body to cover a switch installed in the main body, an actuator mounted on the key top and having at least a portion protruded to press the switch, and a pattern member including a base portion coupled to the actuator and a plated layer having at least a portion penetrating the key top to form a pattern exposed to the outside and plated on an outer surface of the base portion.

21 Claims, 7 Drawing Sheets

MOBILE TERMINAL

CROSS REFERENCE TO RELATED APPLICATIONS

The present application claims priority to Korean Application No. 10-2011-0114144 filed in Korea on Nov. 3, 2011, the entire contents of which is hereby incorporated by reference in its entirety.

BACKGROUND OF THE INVENTION

1. Field of the Invention

The present invention relates to a mobile terminal including a signal input unit for receiving a control command.

2. Description of the Related Art

A mobile terminal is a device that can be carried around and has one or more functions such as voice and video call communication, inputting and outputting information, storing data, and the like.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

In order to implement various functions of such multimedia players or devices, various attempts have been made and implemented in terms of hardware or software.

For example, recently, research into a signal input unit mounted in a terminal has been conducted. In general, a signal input unit is implemented by coupling respective elements through bonding, so it has a problem in that a click feeling is not good and it is difficult to assemble the respective elements. Thus, a solution to the problem may be considered.

SUMMARY OF THE INVENTION

An aspect of the present invention provides a mobile terminal including a signal input unit having enhanced performance.

Another aspect of the present invention provides a mobile terminal including a signal input unit which incurs low fabrication cost.

According to an aspect of the present invention, there is provided a mobile terminal including: a terminal main body and a keypad assembly provided in the main body and formed to receive a control command, wherein the keypad assembly includes a key top disposed on one surface of the main body to cover a switch installed in the main body; an actuator mounted on the key top and having at least a portion protruded to press the switch; and a pattern member including a base portion coupled to the actuator and a plated layer having at least a portion penetrating the key top to form a pattern exposed to the outside and plated on an outer surface of the base portion.

According to an example in relation to an embodiment of the present invention, the pattern may be exposed from a front surface of the key top, and an accommodation portion accommodating the pattern member may be formed on a rear surface of the key top. The accommodation portion may include first and second accommodation portions, and the pattern member may include first and second pattern members independently mounted in the first and second accommodation portions.

The key top may include first and second key tops corresponding to the first and second accommodation portions, respectively, and the first and second key tops may be connected by a connection portion. The connection portion may be bent when one of the first and second key tops is displaced based on the other. First and second actuators which are symmetrical based on the connection portion may be coupled to the first and second pattern members, respectively.

According to an example in relation to an embodiment of the present invention, the actuator and the base portion may be made of different materials. The actuator may be made of a material that cannot be used for plating, and the base portion may be made of a material that can be used for plating.

According to an example in relation to an embodiment of the present invention, the base portion may include a first portion covered by the actuator and a second portion contiguous to the first portion.

The first portion of the base portion may be in surface-contact with the actuator, and the second portion is a portion excluding the surface-contact portion. The plated layer may be formed on the second portion. The actuator and the base portion may be integrally formed through double injection molding, and the plated layer may be plated on the base portion integrally formed with the actuator so as to be formed on the second portion.

According to an example in relation to an embodiment of the present invention, a recess portion may be formed to be recessed on one surface of the pattern member to accommodate at least a portion of the actuator. A protruded portion may be formed to be protruded on the outer surface of the pattern member such that it corresponds to the pattern exposed to the outside. A through hole may be formed in the key top to allow the protruded pattern to be inserted therein.

According to another aspect of the present invention, there is provided a method for fabricating a keypad assembly mounted on a terminal body and formed to receive a control command, including: molding a key top having a through hole formed on one surface thereof; integrally molding a base portion of a pattern member forming a pattern exposed to outside of the main body and an actuator pressing a switch installed in the main body through dual injection molding; plating the base portion integrally formed with the actuator to form a plated layer on an outer surface of the base portion; and mounting the pattern member on a key top of the keypad assembly such that the plated layer is exposed through the through hole.

According to another aspect of the present invention, there is provided a mobile terminal including: a terminal main body and a keypad assembly provided in the main body and formed to receive a control command, wherein the keypad assembly includes a key top having first and second key tops disposed on one surface of the main body to cover switches installed in the main body and disposed to be spaced apart; a first pattern member mounted on a rear surface of the first key top and having at least a portion formed to penetrate the first key top so as to be exposed to the outside; and a second pattern member separately provided from the first pattern member, mounted on a rear surface of the second key top, and having at least a portion formed to penetrate the second key top.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

The embodiments of the present invention will now be described with reference to the accompanying drawings, in which like numbers refer to like elements throughout although the embodiments are different, and a description of the like elements a first embodiment will be used for those of the different embodiment. As used herein, the singular forms "a", "an" and "the" are intended to include the plural forms as well, unless the context clearly indicates otherwise.

The mobile terminal described in the present invention may include mobile phones, smart phones, notebook computers, digital broadcast receivers, PDAs (Personal Digital Assistants), PMPs (Portable Multimedia Player), navigation devices, and the like. However, it would be understood by a person in the art that the configuration according to the embodiments of the present invention can be also applicable to the fixed types of terminals, such as a digital TV, a desktop computer, and the like, except for any elements especially configured for a mobile purpose.

Figure 1:
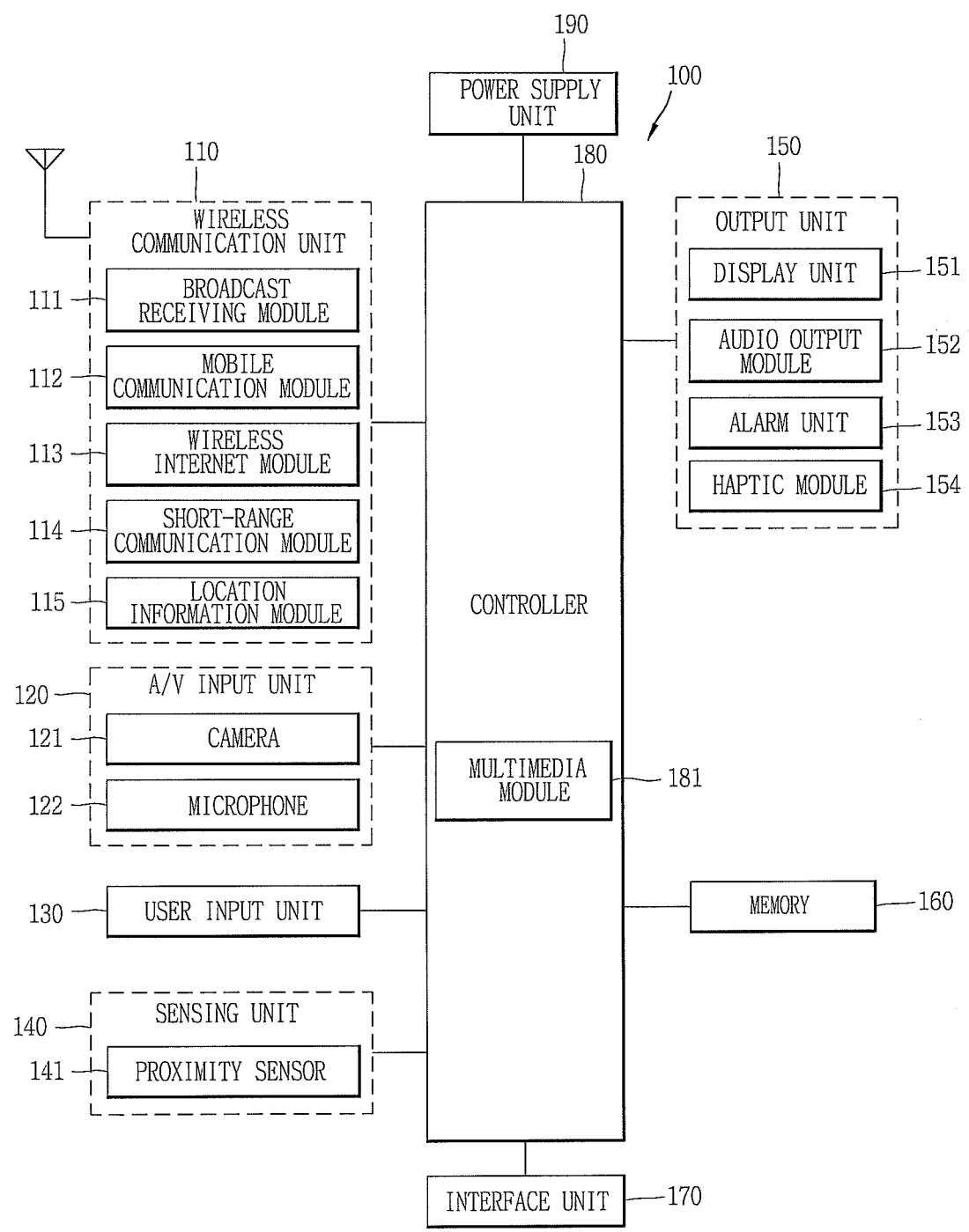
FIG. 1 is a schematic block diagram of a mobile terminal related to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The wireless communication unit 110 typically includes one or more components allowing radio communication between the mobile terminal 100 and a wireless communication system or a network in which the mobile terminal is located. For example, the wireless communication unit may include a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System).

With reference to FIG. 1, the A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units (or other display means) according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 2:
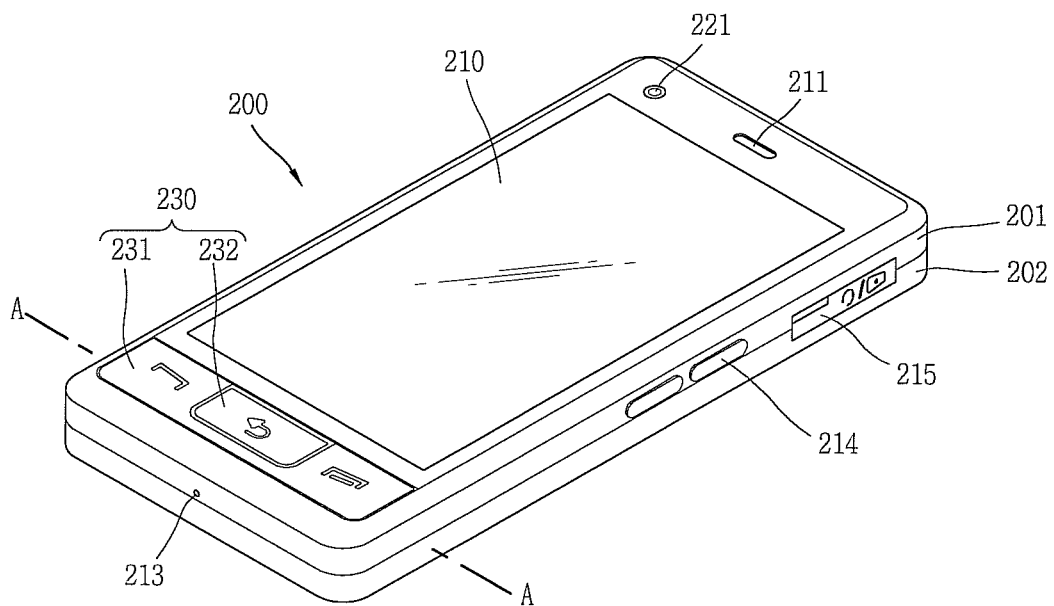
FIG. 2 is a front perspective view of the mobile terminal related to an embodiment of the present invention.
Figure 3:
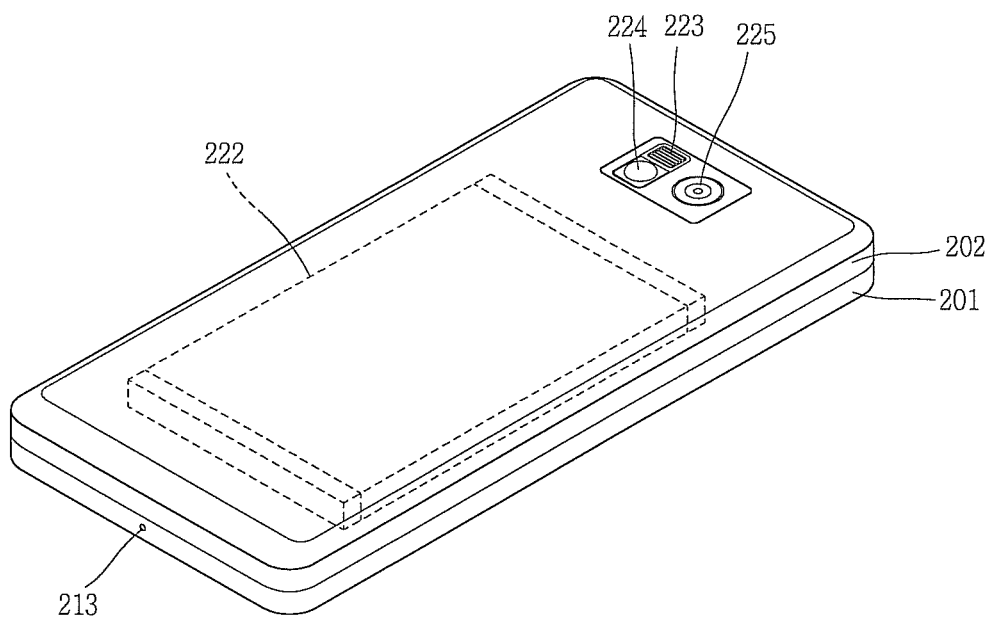
FIG. 3 is a rear perspective view of the mobile terminal illustrated in FIG. 2.

FIG. 2 is a front perspective view of the mobile terminal according to an embodiment of the present invention, and FIG. 3 is a rear perspective view of the mobile terminal illustrated in FIG. 2.

With reference to FIGS. 1 to 3, the mobile terminal 200 has a bar type terminal body. However, without being limited thereto, the present invention can be also applicable to a slide type mobile terminal, a folder type mobile terminal, a swing type mobile terminal, and the like, including two or more bodies which are coupled to be relatively movable. In addition, the mobile terminal described in the present disclosure may also be applicable to a certain mobile electronic device, e.g., a mobile phone, a smart phone, a notebook computer, a tablet computer, a digital broadcasting terminal, a personal digital assistant (PDA), a portable multimedia player (PMO), and the like.

The terminal body includes a case (or casing, housing, cover, etc.) constituting an external appearance of the terminal body. In the present exemplary embodiment, the case may be divided into a front case 201 and a rear case 202. Various electronic components are installed in the space between the front case 201 and the rear case 202. One or more intermediate cases may be additionally disposed between the front case 201 and the rear case 202. The cases may be formed by injection-molding a synthetic resin or may be made of a metallic material such as stainless steel (STS) or titanium (Ti), etc.

A power supply unit 222, a rear camera unit 225, and a second audio output unit 223 are disposed.

The power supply unit 222 supplies power to the mobile terminal 200. The power supply unit 222 may be installed in the terminal body or may be configured to be detachably attached to the terminal body.

A flash 224 is disposed adjacent to the rear camera unit 225. When an image of a subject is captured by using the rear camera unit 225, the flash 224 illuminates the subject A mirror (not shown) may be disposed to be adjacent to the flash 224. The mirror allows the user to see himself when he wants to capture his own image (i.e., self-image capturing) by using the rear camera unit 225.

The second audio output unit 223 may implement a stereoscopic function along with a first audio output unit 211, and may be used for implementing a speaker phone mode during call communication.

The rear camera unit 225 may have an image capture direction which is substantially opposite to that of the front camera unit 221 disposed on the front surface, and may support a different number of pixels (i.e., have a different resolution) than the front camera unit 221.

For example, the front camera unit 221 may operate with a relatively lower resolution to capture an image(s) of the user's face and immediately transmit such image(s) to another party in real-time during video call communication or the like. Meanwhile, the rear camera unit 225 may operate with a relatively higher resolution to capture images of general objects with high picture quality, which may not require immediately transmission in real time. The front and rear camera units 221 and 225 may be installed on the terminal body such that they are rotated or popped up.

A display unit 210, the first audio output unit 211, the front camera unit 221, a side key 214, an interface unit 215, an audio input unit 213, and a signal input unit 230 are disposed on the front surface of the terminal body.

The display unit 210 may be implemented as a liquid crystal display (LCD) module for visually displaying information, an organic light emitting diode (OLED) module, an e-paper, and the like. The display unit 210 may include a touch sensing unit allowing for an inputting operation in a tactile manner. Hereinafter, the display unit 210 including the touch sensing unit will be referred to as a 'touch screen'. When a point on the touch screen 210 is touched, content corresponding to the touched position is input. The content input in the tactile manner may be characters, numbers, menu items that can be indicated or designated in various modes, and the like. The touch sensing unit may be light-transmissive to allow the display unit 210 to be seen, and may have a structure for enhancing visibility of the touch screen in a bright area. In FIG. 2, the touch screen 210 occupies a majority of the front surface of the front case 202.

The audio output unit 211 may be implemented in the form of a receiver that transfers a speaker sound to the user's ear, or in the form of a loud speaker for outputting various alarm sounds or a multimedia reproduction sound of the mobile terminal 200.

The side key 214 may be generally called a manipulation unit, and configured to receive a command for controlling the operation of the mobile terminal 200. The side key 214 may employ any scheme so long as it can be manipulated in a tactile manner by the user. Content inputted by the side key 214 may be variably set. For example, a command for controlling the image input units 221 and 230, a command for adjusting of the size of the sound outputted from the audio output units 211 and 223, or a command for changing the display unit 210 to a touch recognition mode, and the like, may be received.

The audio input unit 213 may be implemented in the form of a microphone in order to receive the user voice, other sounds, and the like.

The interface unit 215 may be used as a communication link (or passage, path, etc.) through which the mobile terminal 200 can exchange data, or the like, with an external device. For example, the interface unit 215 may be implemented in the form of a connection port for connecting an earphone to the mobile terminal via a wireline or wireless means, a port for short-range communications (e.g., an Infrared Data Association (IrDA) port, a Bluetooth™ port, a wireless LAN port, etc.), power supply ports for providing power to the mobile terminal 200, or the like. Also, the interface unit 215 may be a card socket for accommodating a SIM (Subscriber Identification Module) card or a UIM (User Identity Module) card, or an external card such as a memory card for storing information.

The signal input unit 230 is manipulated to receive a command input to control the operation of the mobile terminal 200, and include a plurality of manipulation units. The manipulation units may be generally called a manipulating portion and any types of manipulation units may be employed so long as they can be operated by the user in a tactile manner.

For example, the manipulation portion can be implemented as a dome switch, a touch screen, or touch pad which can receive information or commands input by the user in a pushing or touching manner, or implemented in a manner of using a wheel, a jog or a joystick to rotate keys. The front camera unit 221 processes image frames such as a still image, video, or the like, obtained by an image sensor in an image call mode or an image capture mode. The processed image frames may be displayed on the display unit 210.

The signal input unit 230 is manipulated to receive a command input to control the operation of the mobile terminal 200, and include a plurality of input keys. The input keys may be generally called a manipulating portion and any types of input keys may be employed so long as they can be operated by the user in a tactile manner.

Content input by the signal input unit 230 may be variably set. For example, the signal input unit 230 may be used to input start, end, scroll, or the like.

An embodiment of the present invention includes a display unit 210 constituting a touch screen as the signal input unit 230 and a keypad assembly 231 disposed at one side of the display unit 210.

The keypad assembly 231 may be implemented in the form of a dome switch that can receive a control command or information according to a user's push, and in this connection, a mechanism for enhancing the performance of the keypad assembly 231 is applied. Hereinafter, the structure of the keypad assembly 231 will be described in detail.

Figure 4:
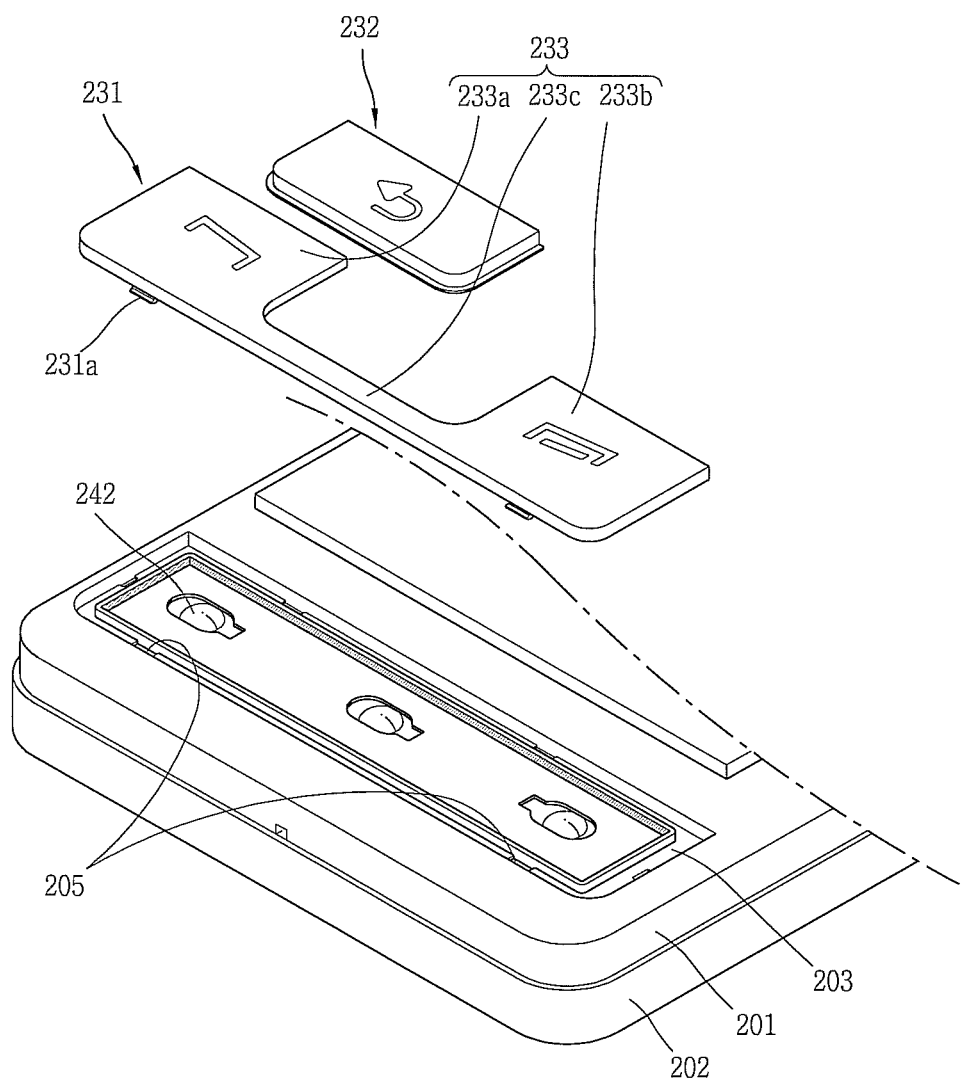
FIG. 4 is a partial exploded perspective view of a keypad assembly of the mobile terminal of FIG. 2.
Figure 5:
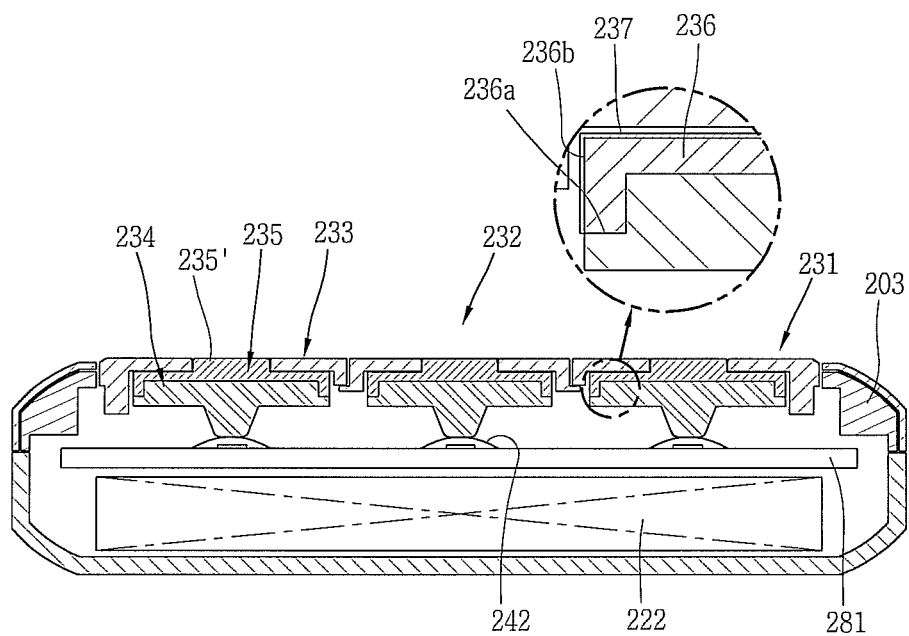
FIG. 5 is a sectional view taken along line A-A of the keypad assembly of FIG. 2.
Figure 6:
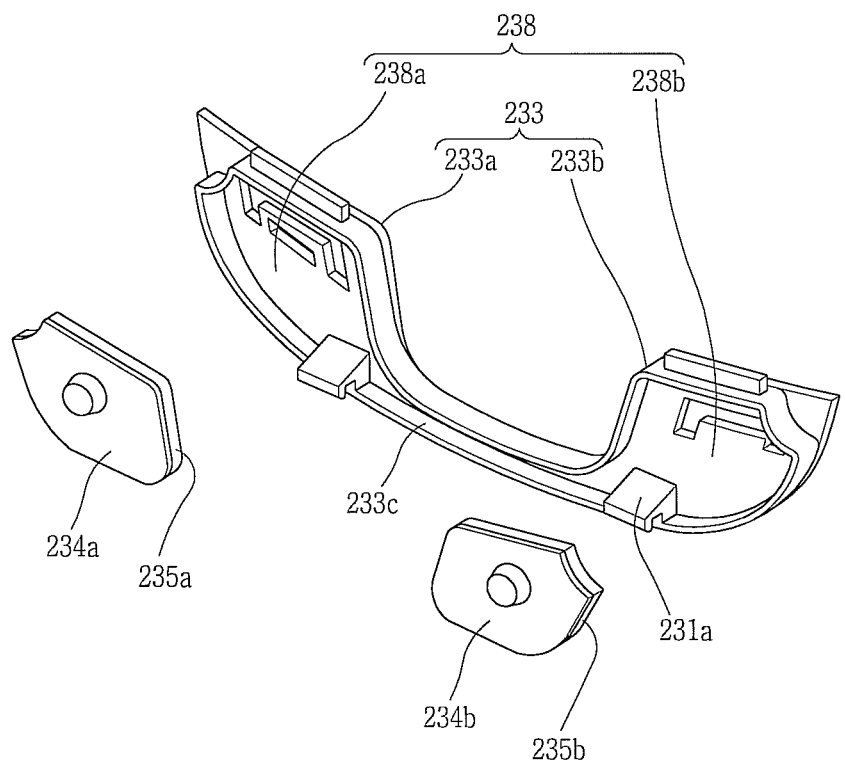
FIG. 6 is an exploded perspective view of the keypad assembly of FIG. 4.

FIG. 4 is a partial exploded perspective view of a keypad assembly of the mobile terminal of FIG. 2. FIG. 5 is a sectional view taken along line A-A of the keypad assembly of FIG. 2. FIG. 6 is an exploded perspective view of the keypad assembly of FIG. 4.

With reference to FIGS. 4 and 5, the mobile terminal includes a middle frame 203, a printed circuit board (PCB) 281 and a keypad assembly 231.

The middle frame 203 is disposed within the terminal body, and the PCB 281 is formed at a lower side of the middle frame 203. The PCB 281 may be electrically connected to a main board within the terminal body by a flexible printed circuit board (FPCB). A power supply unit 222, e.g., a battery, may be formed at a lower side of the PCB 281.

The middle frame 203 may be integrally formed with the front case 201 or may be supported by a support unit formed on the PCB 281. A dome switch 242 is disposed on the PCB 281, and as the dome switch 242 is pressed by the keypad assembly 231, a control signal is generated.

The keypad assembly 231 forms a push type user input unit along with another keypad assembly 232. The keypad assemblies 231 and 232 may be formed such that at least one side thereof is adjacent, but they may also be independently modified or moved. However, the present invention is not necessarily limited thereto, and the mobile terminal may include only any one of the keypad assemblies 231 and 232.

The keypad assemblies 231 and 232 are installed on the middle frame 203. The keypad assemblies 231 and 232 may be assembled to the front case 201 according to a front assembling scheme. For example, a hook portion 231a is formed on the edge of the keypad assembly 231 in contact with the middle frame 203, and a stopping portion 205 is formed on the middle frame 203 to allow the hook portion 231a to be caught therein. Another keypad assembly 232 may have a similar configuration.

In case of a rear assembling scheme in which a key is assembled on an inner surface of the front case 201, an assembling portion is formed on the edge of the key such that it overlaps with the front case 201. However, according to the assembling structure of the present invention, a region in which the keypad assemblies 231 and 232 and the front case 201 overlap with each other is not necessary. Thus, the size of the keypad assemblies 231 and 232 can be maximized.

Hereinafter, the structure of enhancing the performance of one (e.g., the keypad assembly 232) of the keypad assemblies 231 and 232 will be described.

The keypad assembly 231 includes a key top 233, an actuator 234, and a pattern member 235.

The key top 233 is disposed on one surface of the body to cover the switch (i.e., the dome switch) installed within the terminal body. The key top 233 is formed on the uppermost portion of the keypad assembly 231 to form an external appearance of the terminal. The key top 233 is made of, for example, a synthetic resin such as polycarbonate (PC), or the like. However, the present invention is not necessarily limited thereto and the key top 233 may be made of tempered glass, or the like.

The actuator 234 is disposed on a lower surface of the key top 233, and at least a portion thereof is protruded to press the switch. The dome switch 242 is formed on one surface of the PCB 281 facing the actuator 234. The actuator 234 moves in a direction in which it is pressed according to a pressing operation of the key top (i.e., as the key top 233 is pressed), and presses the underlying dome switch 242. Thus, a signal corresponding to a control command of the keypad assembly 231 is generated.

The pattern member 235 is coupled to the actuator 234. At least a portion of the pattern member 235 forms a pattern which penetrates the key top so as to be exposed to the outside.

With reference to FIGS. 4 to 6, the pattern is exposed from a front surface (or an upper surface) of the key top 233, and an accommodation portion 238 accommodating the pattern member 235 is formed on a rear surface (or a lower surface) of the key top 233.

As illustrated, one surface of the pattern member 235 is in surface-contact with at least a portion of the actuator 234. A protruded pattern 235' is formed on the other surface of the pattern member 235 such that it is protruded to correspond to a pattern exposed to the outside. A through hole is formed on the key top 233 to allow the protruded pattern 235' to be inserted therein. The protruded pattern 235' may be exposed to the outside through the through hole to form a pattern indicating "send", "end", or the like, from the surface of the key top 233.

The accommodation portion 238 includes first and second accommodation portions 238a and 238b which are disposed to be spaced apart, and the pattern member 235 includes first and second pattern members 235a and 235b independently mounted on the first and second accommodation portions 238a and 238b. The first and second pattern members 235a and 235b are separately provided and mounted on the first and second accommodation portions 238a and 238b. The key top 233 includes first and second key tops 233a and 233b corresponding to the first and second accommodation portions 238a and 238b, respectively.

As illustrated, the first and second key tops 233a and 233b are connected by a connection portion 233c, and symmetrical based on the connection portion 233c. Also, the connection portion 233c is configured to be bent when any one of the first and second key tops 233a and 233b are displaced based on the other. To this end, the connection portion 233c may be formed to have a smaller width and greater length than those of the first and second key tops 233a and 233b. By the smaller width and greater length, an area cut out from the keypad assembly 231 is formed, and the other keypad assembly 232 may be disposed in the area.

In order to correspond to the structure, the actuator 234 includes first and second actuators 234a and 234b. The first and second actuators 234a and 234b are symmetrical based on the connection portion 233c and coupled to the first and second pattern members 235a and 235b.

In this manner, the separately disposed first and second key tops 233a and 233b and the connection portion 233c are integrally constitute a single key top 233 in terms of external appearance. Also, the first and second actuators 234a and 234b are independently mounted on the rear surface of the single key top 233. According to this structure, in case of a push input with respect to the first and second key tops 233a and 233b (i.e., when the first and second key tops 233a and 233b are pushed for inputting), there is no influence on a click feeling between the first and second key tops 233a and 233b. Namely, a degradation of a click feeling generated due to an assembly deviation, a manufacturing tolerance, or the like, in the first key top 233a does not affect the second key top 233b.

The actuator 234 is made of a material such as, for example, urethane, or the like, to provide a click feeling. In detail, in order to have elastic force and exhibit insulating function, the actuator 234 is made of a chemical compound that cannot be used or difficult to be used for plating. In comparison, a plated layer 237 is formed on the pattern member 235.

The actuator 234 is integrally coupled to the pattern member 235 and may be mounted on the accommodation portion 238 of the key top 233 through bonding, or the like.

In detail, the pattern member 235 includes a base portion 236 coupled to the actuator 234 and a plated layer 237 plated on an outer surface of the base portion 236. Through the plated layer 237, a metallic pattern is formed on the surface of the key top 233 made of a synthetic resin material.

For example, the actuator 234 and the base portion 236 are made of heterogeneous materials, and in particular, the base portion 236 is made of a synthetic resin material that can be used for plating, e.g., acrylonitrile butadiene styrene, copolymer resin (ABS resin).

As illustrated, the base portion 236 includes a first portion 236a covered by the actuator 234 and a second portion 236b contiguous to the first portion 236a. The second portion 236b may be a portion excluding the first portion 236a. For example, the first portion 236a of the base portion 236 is configured to be in surface-contact with the actuator 234, and the second portion 236b may be a portion excluding the surface-contact portion. Namely, the first portion 236a is a boundary surface between the base portion 236 and actuator 234. The surface-contact portion is coagulated in a molten state according to double injection molding to constitute an integrally coupled interface.

Here, the plated layer 237 is formed on the second portion 236b. According to this structure, the actuator 234 and the base portion 236 are integrally formed through double injection molding, and the plated layer 237 may be plated on the base portion 236 integrally formed with the actuator 234 so as to be formed on the second portion 236b. In this case, since the actuator 234 is made of a material that cannot be used or difficult to be used for plating, the plated layer 237 is formed on the second portion 236b of the base portion 236 excluding the actuator 234.

The method for fabricating a keypad assembly implementing integration through double injection molding and partial plating will be described in detail with reference to FIG. 7.

Figure 7:
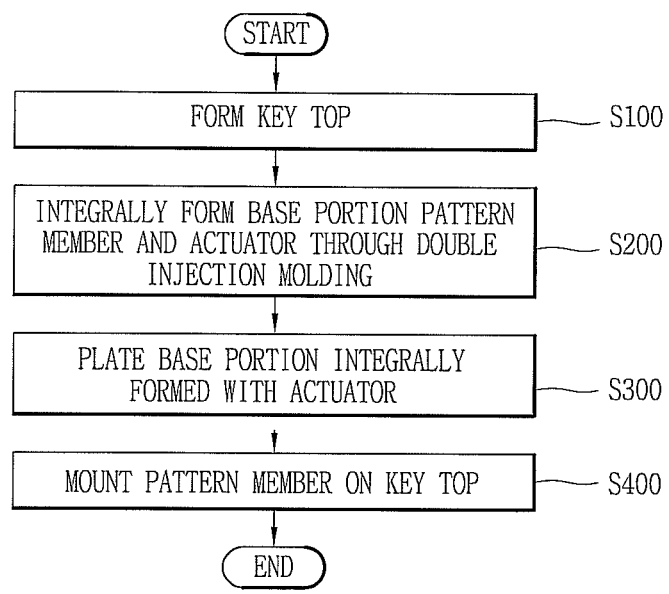
FIG. 7 is a flow chart illustrating a process of fabricating the keypad assembly in relation to the present invention.

With reference to FIG. 7, first, the key top having a through hole formed on one surface thereof is formed (S100). The key top is made of a synthetic resin and may be implemented through injection molding.

Next, the base portion of the pattern member forming a pattern exposed to the outside of the terminal body and the actuator pressing the switch installed in the body are integrally formed (S200).

The actuator and the pattern member are made of different materials. For example, the actuator and the pattern member are made of a urethane compound and an ABS synthetic resin, respectively. In detail, the actuator is first formed, and then, when the pattern member is injection-formed, the actuator is inserted. Accordingly, the actuator and the pattern member may be integrally formed.

And then, the base portion integrally formed with the actuator is plated to form a plated layer on an outer surface of the base portion (S300). When the structure in which the actuator and the pattern member are integrally formed is immersed in a plating solution and plated, the actuator made of the urethane compound is not plated (i.e., the urethane compound is hard to be used for plating) and the pattern member made of the ABS synthetic resin is plated. Thus, only a portion, not in contact with the actuator, of the base portion is plated.

Finally, the pattern member is mounted on the key top of the keypad assembly such that the plated layer is exposed through the through hole (S400), and accordingly, a picto and the actuator may be integrally configured, and here, the picto is made a metallic material, thus implementing the keypad assembly.

Figure 8A:
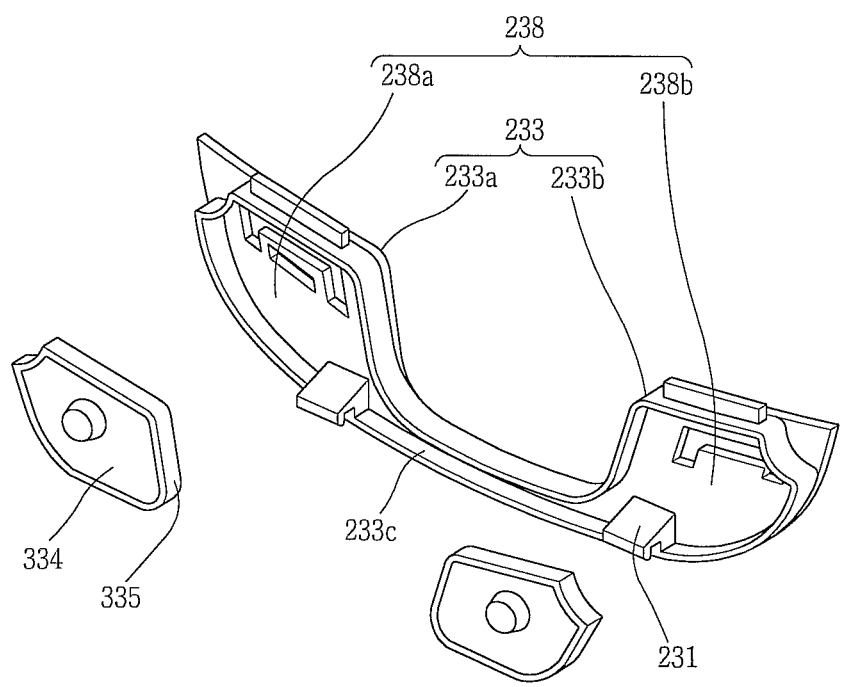
FIGS. 8A and 8B are a perspective view and a sectional view of the keypad assembly according to an embodiment of the present invention.
Figure 8B:
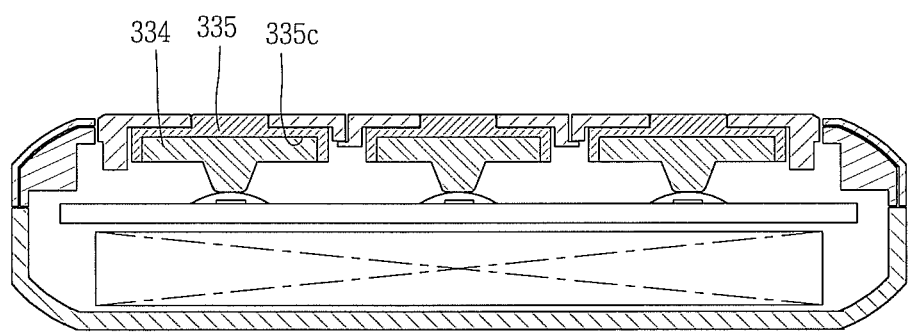

FIGS. 8A and 8B are a perspective view and a sectional view of the keypad assembly according to another embodiment of the present invention.

In an embodiment described hereinafter, like or similar reference numerals are used for the like or similar elements as those of the former embodiment, and a description thereof will be omitted.

With reference to FIGS. 8A and 8B, a recess portion 335c is formed to be recessed on one surface of the pattern member 335 in order to accommodate at least a portion of the actuator 334.

A side wall of the recess portion 335c is formed to have a loop form covering the edge of the pattern member 335, and accordingly, the side wall of the recess portion 335 and the edge of the pattern member form an interface.

The pattern member and the actuator are coupled in the interface through double injection molding, and the pattern member 335 and the actuator 334 which are made of heterogeneous materials are firmly integrated. Namely, as the pattern member 335 is accommodated in the recess portion 335c, a coupling surface of the pattern member 335 and the actuator 334 is increased, and accordingly, durability of the keypad assembly is increased.

Figure 9:
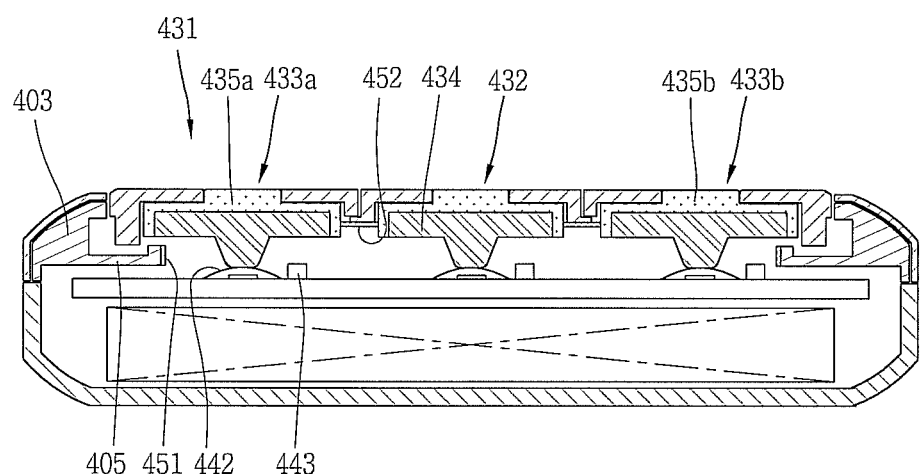
FIG. 9 is a sectional view showing a mobile terminal according to an embodiment of the present invention.

In the above description, the pattern of the metal material is implemented through plating, but the present invention not necessarily limited thereto. FIG. 9 is a sectional view showing a mobile terminal according to another embodiment of the present invention.

As illustrated in FIG. 9, portions of first and second pattern members 435a and 435b are made of a transparent material. The transparent portion may allow light to be transmitted therethrough.

In detail, the first and second pattern members 435a and 435b may be made of a synthetic resin of a transparent material, e.g., transparent acryl, transparent polycarbonate (PC), or the like. When the first and second pattern members 435a and 435b are injection-formed, an actuator 434 made of a urethane resin or a rubber material is inserted to be integrated.

A plated layer is not formed on an outer surface of the first and second pattern members 435a and 435b, and thus, a pattern having transparent texture appears from an outer surface of first and second key tops 433a and 433b.

A light emitting unit 443 is disposed on a PCB 481. The light emitting unit 443 may include at least one light emitting diode (LED). The light emitting unit 443 emit light toward the first and second key tops 433a and 433b.

A shielding wall 405 blocks a gap formed between the front case 401 and the first and second key tops 433a and 433b to prevent a light leakage to the gap. The shielding wall 405 is formed to be protruded from a middle frame 403 toward the first and second key tops 433a and 433b. Namely, the shielding wall 405 may be integrally formed with the middle frame 403. For example, the shielding wall 405 may form a loop along the edges of the first and second key tops 433a and 433b.

A reflective member 451 may be formed on at least one surface of the shielding wall 405. For example, the reflective member 451 is formed on an inner circumferential surface of the shielding wall 405 forming the loop to reflect light made incident to the shielding wall 405. The reflective member 451 may be formed of a film having excellent light reflectivity.

As illustrated, a light blocking film 452 may be formed between the keypad assemblies 431 and 432 to block light. The light blocking film 452 may be integrally formed to fix the keypad assemblies 431 and 432 and block light that may be leaked through a gap between the keypad assemblies 431 and 432.

The keypad assemblies 431 and 432 are moved or deformed independently, so, preferably, the light blocking film 452 is formed of an elastic member so that it may not be affected by the keypad assemblies 431 and 432. For example, the light blocking film 452 may be made of a rubber material.

Thus, a gap between the first and second key tops 433a and 433b and the front case 201 can be blocked by the shielding wall 405 and the gap between the keypad assemblies 431 and 432 can be blocked by the light blocking film 452. Accordingly, a light leakage to the outside of the mobile terminal can be solved.

As described above, according to the embodiments of the present invention, the picto structure mounted on the rear surface of the key tops can be integrally configured. Thus, there is no assembly deviation, enhancing deviation with respect to a connection click feeling and a click rate.

Also, since a process for bonding a plurality of components of the picto structure is not required, fabrication cost can be reduced.

The mobile terminal according to the embodiments of the present disclosure is not limited in its application of the configurations and methods, but the entirety or a portion of the embodiments can be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
a main body having a case; and
a keypad assembly provided in the main body to receive a control command,
wherein the keypad assembly includes:
a key top movably mounted on one surface of the case to cover a switch provided in the main body,
an actuator to press the switch, and
a pattern member having a portion to penetrate from the key top and be exposed to outside of the main body, the pattern member including a base portion coupled to the actuator and a plated layer on a surface of the base portion, wherein the base portion is provided between the plated layer and the actuator, and
wherein the pattern member is coupled to the key top such that the key top, the pattern member and the actuator are configured to move with respect to the case when the key top is pressed,
wherein the portion of the pattern member is exposed from a front surface of the key top, and the key top includes an accommodation portion on a rear surface of the key top to receive the pattern member.

2. The mobile terminal of claim 1, wherein the accommodation portion includes a first accommodation portion and a second accommodation portion, and the pattern member includes a first pattern member provided in the first accommodation portion and a second pattern member provided in the second accommodation portion.

3. The mobile terminal of claim 2, wherein the key top includes a first key top corresponding to the first accommodation portion and a second key top corresponding to the second accommodation portion, and the first key top is coupled to the second key top by a bendable connection portion.

4. The mobile terminal of claim 3, wherein the actuator includes a first actuator to couple to the first pattern member and a second actuator to couple to the second pattern member, wherein the first actuator and the second actuator are symmetrical based on the connection portion.

5. The mobile terminal of claim 1, wherein the actuator and the base portion of the pattern member are made of different materials.

6. The mobile terminal of claim 5, wherein the base portion is made of a plating material, and the actuator is made of a non-plating material.

7. The mobile terminal of claim 1, wherein the base portion of the pattern member includes a first portion to cover the actuator and a second portion contiguous to the first portion.

8. The mobile terminal of claim 7, wherein the plated layer is formed on the second portion of the base portion.

9. The mobile terminal of claim 7, wherein the actuator and the base portion of the pattern member are integrally formed by double injection molding, and the plated layer of the pattern member is plated on the base portion that is integrally formed with the actuator so as to be formed on the second portion of the pattern member.

10. The mobile terminal of claim 1, wherein the pattern member includes a recess portion on a surface of the pattern member to accommodate a portion of the actuator.

11. A mobile terminal comprising:
a main body having a case; and
a keypad assembly provided in the main body to receive a control command,
wherein the keypad assembly includes:
a key top having a first key top and a second key top movably mounted on a surface of the case, the first key top to cover a first switch provided in the main body, and the second key top to cover a second switch provided in the main body,
a first pattern member on a rear surface of the first key top, the first pattern member having a portion to penetrate the first key top so as to be exposed to outside of the keypad assembly, and
a second pattern member separately provided from the first pattern member, the second pattern member provided on a rear surface of the second key top, and the second pattern member having a portion to penetrate the second key top so as to be exposed to outside of the keypad assembly,
wherein the first key top and the first pattern member are configured to move with respect to the case when the first key top is pressed, and
wherein the second key top and the second pattern member are configured to move with respect to the case when the second key top is pressed,
wherein the portion of the first pattern member is exposed from a front surface of the first key top, and the first key top includes an accommodation portion on the rear surface of the first key top to receive the first pattern member, and
wherein the portion of the second pattern member is exposed from a front surface of the second key top, and the second key top includes an accommodation portion on the rear surface of the second key top to receive the second pattern member.

12. The mobile terminal of claim 11, wherein the keypad assembly further includes a bendable connection portion to couple the first key top to the second key top.

13. The mobile terminal of claim 11, wherein the keypad assembly further includes:
 a first actuator to press the first switch, the first actuator provided between the first pattern member and the first switch; and
 a second actuator to press the second switch, the second actuator provided between the second pattern member and the second switch.

14. The mobile terminal of claim 13, wherein the first pattern member includes a base portion coupled to the first actuator and a plated layer on an outer surface of the base portion.

15. The mobile terminal of claim 13, wherein the base portion of the first pattern member includes a first portion to cover the first actuator and a second portion contiguous to the first portion.

16. The mobile terminal of claim 15, wherein the plated layer is formed on the second portion of the base portion.

17. A mobile terminal comprising:
 a main body having a case;
 a display in the main body;
 a circuit board in the main body;
 a first switch and a second switch on the circuit board; and
 a keypad assembly provided at one side of the display, the keypad assembly including:
  a key top having a first key top and a second key top movably mounted on a surface of the case, the first key top to correspond to the first switch and the second key top to correspond to the second switch;
  a first pattern member on a rear surface of the first key top, the first pattern member having a portion to penetrate the first key top so as to be exposed to outside of the keypad assembly;
  a second pattern member on a rear surface of the second key top, and the second pattern member having a portion to penetrate the second key top so as to be exposed to outside of the keypad assembly;
  a first actuator associated with the first switch, the first actuator provided between the first pattern member and the first switch; and
  a second actuator associated with the second switch, the second actuator provided between the second pattern member and the second switch,
 wherein the first key top, the first pattern member and the first actuator are configured to move with respect to the case when the first key top is pressed, and
 wherein the second key top, the second pattern member and the second actuator are configured to move with respect to the case when the second key top is pressed,
 wherein the portion of the first pattern member is exposed from a front surface of the first key top, and the first key top includes an accommodation portion on the rear surface of the first key top to receive the first pattern member, and
 wherein the portion of the second pattern member is exposed from a front surface of the second key top, and the second key top includes an accommodation portion on the rear surface of the second key top to receive the second pattern member.

18. The mobile terminal of claim 17, wherein the keypad assembly further includes a bendable connection portion to couple the first key top to the second key top.

19. The mobile terminal of claim 17, wherein the first pattern member includes a base portion coupled to the first actuator and a plated layer on an outer surface of the base portion.

20. The mobile terminal of claim 17, wherein the base portion of the first pattern member includes a first portion to cover the actuator and a second portion contiguous to the first portion.

21. The mobile terminal of claim 17, wherein the plated layer is formed on the second portion of the base portion.

* * * * *